United States Patent [19]

Gauggel

[11] 4,288,050
[45] Sep. 8, 1981

[54] STEERING DEVICE FOR MISSILES

[75] Inventor: Roland Gauggel, Uberlingen, Fed. Rep. of Germany

[73] Assignee: Bodenseewerk Geratetechnik GmbH, Uberlingen, Fed. Rep. of Germany

[21] Appl. No.: 51,672

[22] Filed: Jun. 25, 1979

[30] Foreign Application Priority Data

Jul. 12, 1978 [DE] Fed. Rep. of Germany ....... 2830502

[51] Int. Cl.³ .............................................. F41G 7/00
[52] U.S. Cl. ................................................. 244/3.16
[58] Field of Search ..................... 244/3.15, 3.16, 3.19

[56] References Cited

U.S. PATENT DOCUMENTS

| | | | |
|---|---|---|---|
| 2,992,423 | 7/1961 | Floyd et al. | 244/3.15 |
| 3,001,186 | 9/1961 | Baltzer | 244/3.15 |
| 3,064,924 | 11/1962 | Fairbanks | 244/3.16 |
| 3,081,050 | 3/1963 | Lapham et al. | 244/3.19 |
| 3,133,188 | 5/1964 | Satyendra | 244/3.16 |
| 3,171,612 | 3/1965 | Hildebrant | 244/3.15 |
| 3,206,143 | 9/1965 | Munchhofen | 244/3.15 |
| 3,784,800 | 1/1974 | Willoteaux | 244/3.15 |

*Primary Examiner*—Sal Cangialosi
*Attorney, Agent, or Firm*—Howard H. Darbo

[57] ABSTRACT

A target seeker on the missile looks at the hot spot behind the jet engine of the airplane to be intercepted and continuously produces signals representing, respectively, the rate of change of the distance between the two and the angular distance between the longitudinal axis of the missile and the optical axis of the target seeker. An approach sensor on the missile produces a signal representing the distance between the two. Initially, the rate of change signal is used to guide the missile, in a conventional manner by the laws of proportional navigation. Depending upon the embodiment, after angular distance signal exceeds predetermined thresholds, or after the distance between the two is below predetermined thresholds, the angular distance signal is used in conjunction with other signals, or alone, in the guidance of the missile.

3 Claims, 4 Drawing Figures

STEERING DEVICE FOR MISSILES

BACKGROUND AND SUMMARY OF THE INVENTION

The invention relates to a steering device for missiles, which are steered onto airplanes by means of a target seeker, wherein the target seeker is continuously directed towards a target, and a sight line rate signal proportional to the rate of change in space of the sight line to this target is applied to a steering controller.

In a prior art steering device of this type (German Pat. No. 1 406 578) the target seeker comprises a gyro rotor, which carries an optical system in the form of a Cassegrain system, the optical axis of which coincides with the axis of rotation of the gyro rotor. A reticle rotating also with the gyro rotor is provided in the image plane of the optical system and has on one half, for example, alternatingly transparent and opaque sectors or a checkerboard pattern and on the other half a system of concentric alternatingly transparent and opaque rings. The radiation passing through the reticle and through a filter transparent to infrared radiation falls on an infraredsensitive detector, which provides a modulated a.c. signal, when a target outside the optical axis has been detected. The phase of the a.c. signal obtained after demodulation depends on the direction of the target deviation from the optical axis of the system, and the amplitude of the a.c. signal depends on the amount of the target deviation. The gyro rotor is diagonally magnetized and is surrounded by an annular coil. The a.c. signal appropriately amplified is applied to this annular coil, whereby torques are applied to the radially magnetized gyro rotor cyclically with the frequency of rotation, and the gyro rotor will precess with the optical axis of the system onto the target. Thereby the gyro rotor is caused to follow the target continuously with its axis of rotation and the axis of the optical system.

In accordance with the gyroscope laws, the signals required therefor in the annular coil are proportional to the angular rate of the sight line in space, the inertial sight line rate. As, with straight and uniform movement of missile and target, a collision course will be steered when the sight line from the missile to the target remains stationary in space, the signals applied to the annular coil are, at the same time, applied to the steering controller of the missile as sight line rate signals, whereby the heading rate of the missile becomes proportional to the inertial sight line rate.

Such missiles are used, for example, as air-to-air missiles, the target being the hot gases of the jet engines of airplanes.

It is also known to detect the deflection of the axis of the gyro rotor with respect to the missile longitudinal axis and to determine the "look angle". With the prior art steering devices the look angle signal is, however, applied to the steering controller as the sole steering command, whereby the look angle is controlled to become zero and the longitudinal axis of the missile is directed to the target. Thereby, however, the missile is guided to the target in less than the most favorable manner.

The misdistance of air-to-air missiles the target seekers of which are equipped with infrared sensitive detectors, in paticular InSb-detectors, can be substantially impaired in the proximity zone of the target. It has been found that this is due to the presence of so-called "hot spots". "Hot spots" are nodal areas within the exhaust gas jet of jet engines of modern fighter planes, which to a particular extent emit radiation within the sensitivity range of InSb-detectors. During afterburner operation the radiation intensity in the "hot spots" may assume such high values that the hot spots are detected by the target seeker and can be pursued as dummy targets. As such hot spots may occur at a distance of up to 15 meters from the tail of the airplane, this means a large misdistance from the target proper even with otherwise faultless steering of the missile.

But even if the pursuit of the target is not disturbed by hot spots, for example with r.f. target seekers, it is generally desirable to steer the missile to a point which is somewhat offset along the airplane longitudinal axis from the nose, for example towards the cockpit, where a hit is normally more efficient.

It is the object of the invention, with a steering device of the type defined in the beginning to steer the missile to a point which is offset from the nose in the direction of the airplane longitudinal axis relative to the point pursued by the target seeker.

According to the invention this object is achieved in that a sensor responding to the "look angle" between missile longitudinal axis and optical axis of the seeker is provided, and the look angle signal from this sensor is applied to a threshold switch, which provides an output signal of corresponding sign, when a positive threshold value is exceeded or a negative threshold value is fallen below; that an approach sensor is provided, which provides a distance signal in accordance with the distance between missile and airplane, and that the output signal from the threshold switch and the distance signal are applied to a combining circuit for forming a lead signal applied to the steering controller, said lead signal deflecting the trajectory of the missile towards a point offset in the direction of the airplane velocity vector with respect to the target, to which the target seeker is directed, when the distances are small and the look angles are large.

In the idealized case of straight uniform movement of target and missile, the missile is steered so as to keep the sight line to the target stationary in space. The larger the angle becomes between the missile longitudinal axis and the sight line, the larger will be the angle between sight line and airplane velocity vector. When the velocity vector of the target airplane extends in the direction of the sight line, the missile has to fly in the direction of the sight line and its longitudinal axis is aligned therewith and thus also with the axis of the target seeker. The "look angle" is then zero. If, however, the airplane moves at an angle transversely to the sight line, the missile longitudinal axis has to form such an angle with the sight line that it, and thereby also the direction of movement of the missile, are directed to a point which is in front of the airplane in the direction of movement thereof. A lead signal will be generated only, if the angle between sight line and flight velocity vector and thus the look angle exceed a certain predetermined level. The sign of the lead signal is determined by the sign of the look angle.

Furthermore, the lead signal is dependent on the distance between missile and target airplane. At a large distance of the missile from the target airplane, no or practically no lead signal is required, because, as viewed from large distance, the angular rate of the sight line vector to the target airplane and, for example, that of the sight line vector to a "hot spot" are practically identical. A lead signal becomes effective at small distances from the target.

Two embodiments of the invention are described in greater detail hereinbelow with reference to the accompanying drawings.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

Figure 1:
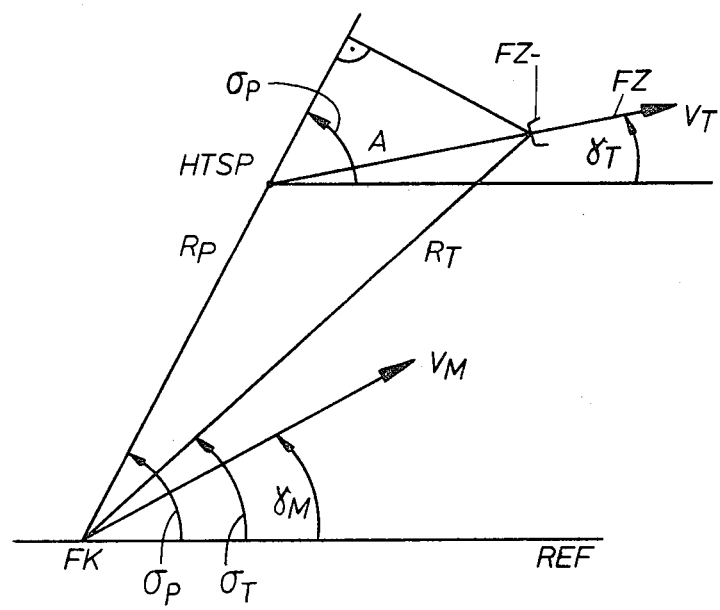
FIG. 1 illustrates the trajectory geometry.

Be it assumed, that the airplane FZ to be pursued generates a "hot spot" HTSP on the extension of the airplane longitudinal axis at a distance A behind its engine exhaust pipe, and that the seeker of the missile FK pursues this hot spot (as a "target") instead of the airplane engine. In accordance with the laws of proportional navigation the missile FK would then be steered such that any change of the sight line angle $\sigma_P$ to this hot spot HTSP in space is counteracted, and that the missile undesirably follows a collision course with the hot spot HTSP. The following relation between the sight line angle $\sigma_P$ to the dummy target hot spot HTSP and the sight line angle $\sigma_T$ to the true target and between the corresponding sight line rates results from the trajectory geometry of FIG. 1: It is $$\sin(\sigma_P - \sigma_T) = \frac{A \sin(\sigma_P - \gamma_T)}{R_T} \qquad (1)$$

wherein $\gamma_T$ is the angle between the airplane velocity vector $V_T$ and the reference direction REF, and $R_T$ is the distance between missile FK and airplane.

By differentiation with respect to time this yields:

$$\dot{\sigma}_T = \dot{\sigma}_P - \frac{A}{R_T} \cdot \frac{1}{\cos(\sigma_P - \sigma_T)} \cdot \qquad (2)$$

$$\left( (\dot{\sigma}_P - \dot{\gamma}_T) \cos(\sigma_P - \gamma_T) - \frac{\dot{R}_T}{R_T} \sin(\sigma_P - \gamma_T) \right).$$

Thus a lead signal has to be superposed at the steering controller to the $\dot{\sigma}_P$—steering signal provided by the seeker, in order to control not $\dot{\sigma}_P$ but $\dot{\sigma}_T$ and to steer the missile to the airplane instead of to the hot spot HTSP.

Equation (2) can be simplified as follows:

1. The quantity $$\frac{1}{\cos(\sigma_P - \sigma_T)}$$

can approximately be assumed as unity. At a large distance from the target $\sigma_P$ is substantially equal to $\sigma_T$. The angles differ to a noticeable extent only after such an approach to the target that correction of the steering command will not have any noticeable effect on the trajectory of the missile anyhow.

2. With conventional air-to-air missiles $\dot{\sigma}_P$ is small, on one hand, due to the high gain in the steering loop. Also the direction of flight of the target changes relatively slowly, so that the term $\dot{\sigma}_P - \dot{\gamma}_T$ is relatively small. $\dot{R}_T$, i.e., the rate of approach of the missile towards the airplane is relatively large, so that $\dot{R}_T/R_T$ becomes large as compared to $\dot{\sigma}_P - \dot{\gamma}_T$ and the second term in the brackets of equation (2) always outweighs the first term, when the angle difference $\sigma_P - \gamma_T$ does not become too small.

The angle $\sigma_P - \gamma_T$ between the sight line to the dummy target HTSP and the airplane velocity depends, as previously explained, on the look angle $\lambda$ between missile axis and target seeker axis. The sine function of $\sigma_P - \gamma_T$ can approximately be replaced by a step function of the look angle $\lambda$, said step function having the value zero with small look angles and having a fixed positive value K above a limit angle $+\lambda_G$, and having a corresponding negative value $-K$ below a negative limit angle $-\lambda_G$. Thereby equation (2) is simplified to read $$\dot{\sigma}_T = \dot{\sigma}_P - \dot{\sigma}_{PK} \text{ with } \lambda > \lambda_G \qquad (3)$$

$$\dot{\sigma}_T = \dot{\sigma}_P \qquad \text{with } \lambda \leq \lambda_G$$

wherein $$\dot{\sigma}_{PK} = A \cdot K \frac{\dot{R}_T}{R_T{}^2} \text{ sign}(\lambda) \qquad (4)$$

When the look angle $\lambda$ remains small during the whole flight, it is substantially the case of a shot from directly behind, so that the hot spots will not affect the steering of the missile adversely. In this case no correction signal $\dot{\sigma}_{PK}$ will be superposed. Superposing of a correction signal is effected with rather large look angles, which occur, when the target airplane moves transversely to the sight line.

The essential quantities required in equation (4) are the approach rate $\dot{R}_T$ and the distance $R_T$ of the missile from the target. Both quantities are measured by means of an approach sensor. The distance A between hot spot HTSP and airplane tail is assumed to be constant and, together with the appropriately selected quantity K, defines the gain of the correction term.

Figure 2:
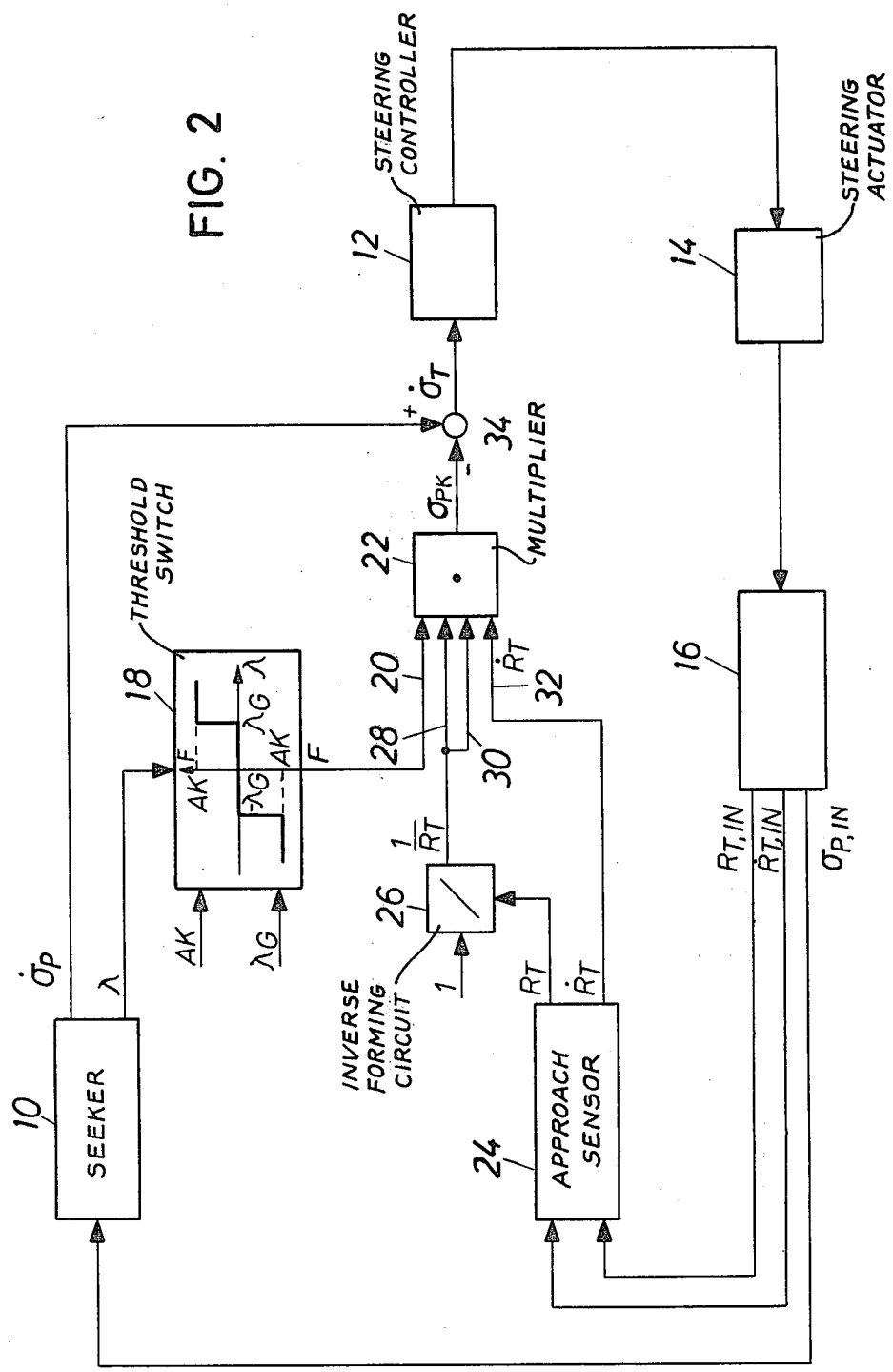
FIG. 2 is a block diagram of an embodiment of a steering device of the invention.

A circuit arrangement, by which correction of the steering signal in accordance with equations (3) and (4) is effected, is illustrated as block diagram in FIG. 2. Numeral 10 designates a missile mounted seeker, which, for example, may be of the type disclosed in German Pat. No. 1 406 578. It provides an output signal proportional to $\dot{\sigma}_P$, the angular rate of the sight line vector to the target pursued by seeker 10, said target being the hot spot HTSP in the present case. This signal $\dot{\sigma}_P$ is applied to the steering controller 12, which directs the missile movement through a steering actuator 14 in conventional manner. The missile movement and trajectory kinematics is symbolized by a box 16 in FIG. 2. It has influence on $R_T$, $\dot{R}_T$ and $\sigma_P$. This is the steering loop of a missile with proportional navigation.

The seeker 10 also has an output signal of the look angle $\lambda$. This output signal is applied to a threshold switch 18. The threshold switch 18 provides the output signal zero with $-\lambda_G \leq \lambda \leq +\lambda_G$. With look angles $\lambda > \lambda_G$, the threshold switch 18 provides a signal $+AK$; with look angles $\lambda < -\lambda_G$, the output signal is $-AK$.

The output signal of the threshold switch 18 is applied to one input 20 of a multiplier 22. An approach sensor 24 provides signals in accordance with the distance $R_T$ between missile and target airplane and with the distance rate $\dot{R}_T$. The distance signal $R_T$ is applied to an inverse-forming circuit 26.

In practice the inverse-forming circuit 26 is a quotient former which has a constant signal "one" applied to its numerator input and the signal $R_T$ to the denominator input. The output signal $1/R_T$ of the circuit 26 is simultaneously applied to two inputs 28, 30 of the multiplier circuit. The signal $\dot{R}_T$ from the approach sensor 24 is applied to a further input 32 of the multiplier 32. The multiplier 22 generates a signal proportional to the product of all signals applied to the four inputs 20, 28, 30 and 32, and this signal is superposed to the sight line rate signal $\dot{\sigma}_P$ by adder 34 to produce the lead signal delivered to the input of the steering controller 12.

When the look angle $\lambda$ is between $-\lambda_G$ and $+\lambda_G$, the signal at the input 20 is zero, and correspondingly the output signal of the multiplier 22 also is zero. The steering of the missile is effected, in conventional manner in accordance with the laws of proportional navigation towards the hot spot, which, however, is substantially aligned with the target proper as viewed from the missile, so that the missile eventually with hit the target. If the look angle $\lambda$ becomes larger than $+\lambda_G$ or smaller than $-\lambda_G$, an output signal from the threshold switch 18 causes the multiplier 22 to provide a lead signal $\dot{\sigma}_{PK}$ in accordance with equation (4), which is superposed to the signal $\dot{\sigma}_P$ at adder 34 in agreement with equation (3).

Figure 3:
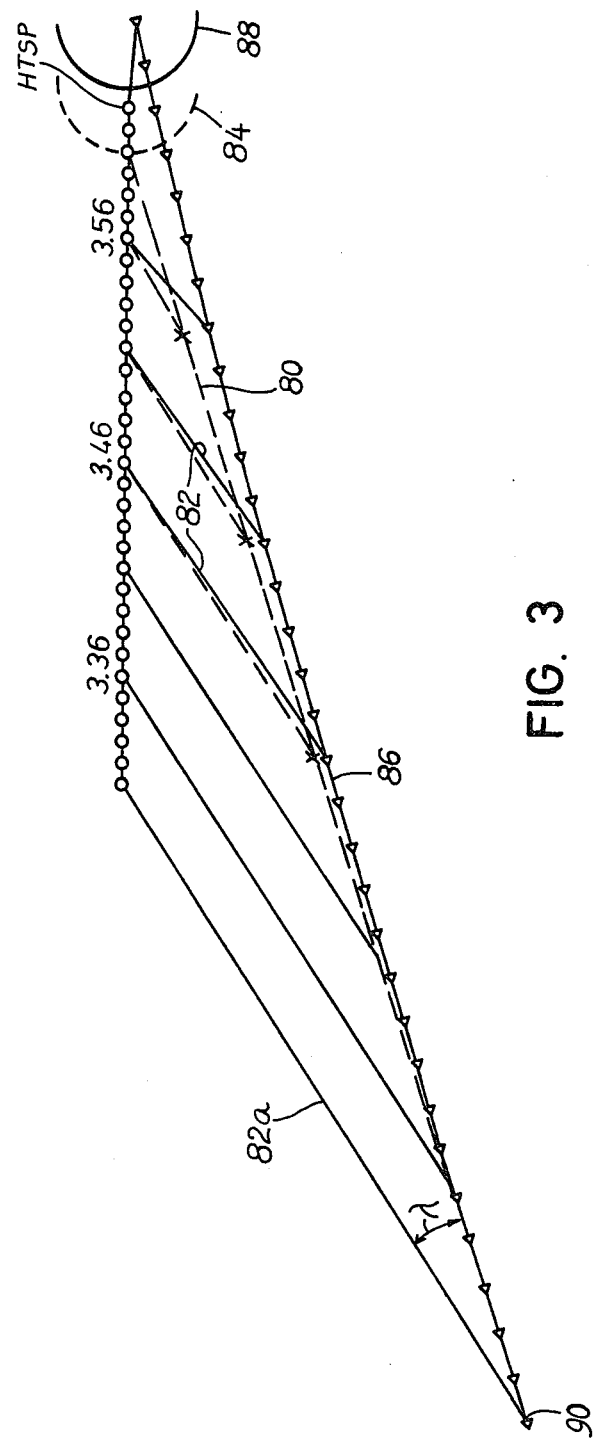
FIG. 3 illustrates the result of a simulation of the trajectories of a target airplane and of a missile steered by means of a steering device of the invention.

FIG. 3 illustrates the result of a simulation of the correction method described. This simulates the homing flight of a realistic air-to-air missile onto a non-maneuvering target with the following initial conditions:

t=0
  $V_M = 300$ meters/sec.; launching velocity of the missile
  $V_T = 300$ meters/sec.; velocity of target
  $\sigma_{Po} = 60°$; attack angle
  $R_{To} = 800$ meters; distance at launching After a flight time of 3.26 seconds the trajectory geometry shown in FIG. 3 has ensued. Up to this moment the missile flew in accordance with the pure proportional navigation and reduced its distance from the target down to 130 meters. This flying condition is the basis for the homing flight with or without correction. The dashed line 80 represents the trajectory of the missile without correction. The transverse connection lines 82 between missile and target trajectories are the sight lines between missile seeker and hot spot in time intervals of 0.05 seconds. After 3.6 seconds the missile passes the hot spot HTSP with a misdistance of about 0.2 meters. If it is assumed that the permissible misdistance is 10 meters, as illustrated by the dashed circle 84, the missile will just fail to meet the hit condition.

With the correction described the missile flies along the trajectory of the solid line 86. The missile crosses the trajectory 10 meters in front of the hot spot HTSP and thus hits the target accurately. The hit condition in this moment is illustrated by the circle shown by a solid line 88.

At any given instant, say at point 90, the respective part of the missile trajectory line 86 corresponds to the longitudinal axis of the missile. At that instant the sight line 82a corresponds to the optical axis of the seeker 10. Thus the angular distance between the two is $\lambda$.

The steering device may be simplified further, if provision is made that the approach rate $\dot{R}_T$ will not fall below a certain minimum value $\dot{R}_{Tmin}$, which is defined by $$\left| A \cdot K \frac{R_{Tmin}}{R_{TG}^2} \right| \geqq 2 \left| \dot{\sigma}_{PG} \right|. \tag{5}$$

In this unbalanced equation, $\dot{\sigma}_{PG}$ is the limit value of the sight line rate which results in the maximum control surface torque of the missile. The steering controller gets a signal proportional to the sight line rate $\dot{\sigma}_P$ and causes a control surface torque counteracting the change of the sight line, said torque, in turn, being proportional to the sight line rate. The maximum control surface torque, which is determined by the design, corresponds to a certain limit value $\dot{\sigma}_{PG}$ of the sight line rate.

$R_{TG}$ is a limit value of the distance from the target, which is determined by the fact, that, with the maximum possible transverse acceleration of the missile as determined by the design, a predetermined optimum lead of the missile can be achieved when starting from this distance. This limit value is preestablished and is not a varying input signal as might be incorrectly assumed from the FIG. 4 diagram.

If the condition given in equation (5) is met, the missile can be steered, at first, in conventional manner in accordance with the laws of proportional navigation, until the distance $R_{TG}$ from the target has been reached. At this distance the steering loop is broken up and the steering command $\dot{\sigma}_{PG}$ which causes maximum transverse acceleration of the missile, is applied to the steering controller. Because of the corresponding selection of the distance $R_{TG}$, this steering command $\dot{\sigma}_{PG}$ generates the desired lead relative to the heading determined by the last received $\dot{\sigma}_P$—information.

This signal is, however, as in the steering device of FIG. 2, applied only, when the look angle exceeds given limit values $+\lambda_G$. The signals applied to the steering controller will then be:

$$\sigma_T = \sigma_p \text{ for } |\lambda| \leqq \lambda_G \text{ and } R_T \leqq R_{TG} \text{ or } R_T > R_{TG} \tag{6}$$

$$\sigma_T = 2 \cdot \dot{\sigma}_{PG} \cdot \text{sign}(\lambda) \text{ for } |\lambda| > \lambda_G \text{ and } R_T < R_{TG}.$$

Figure 4:
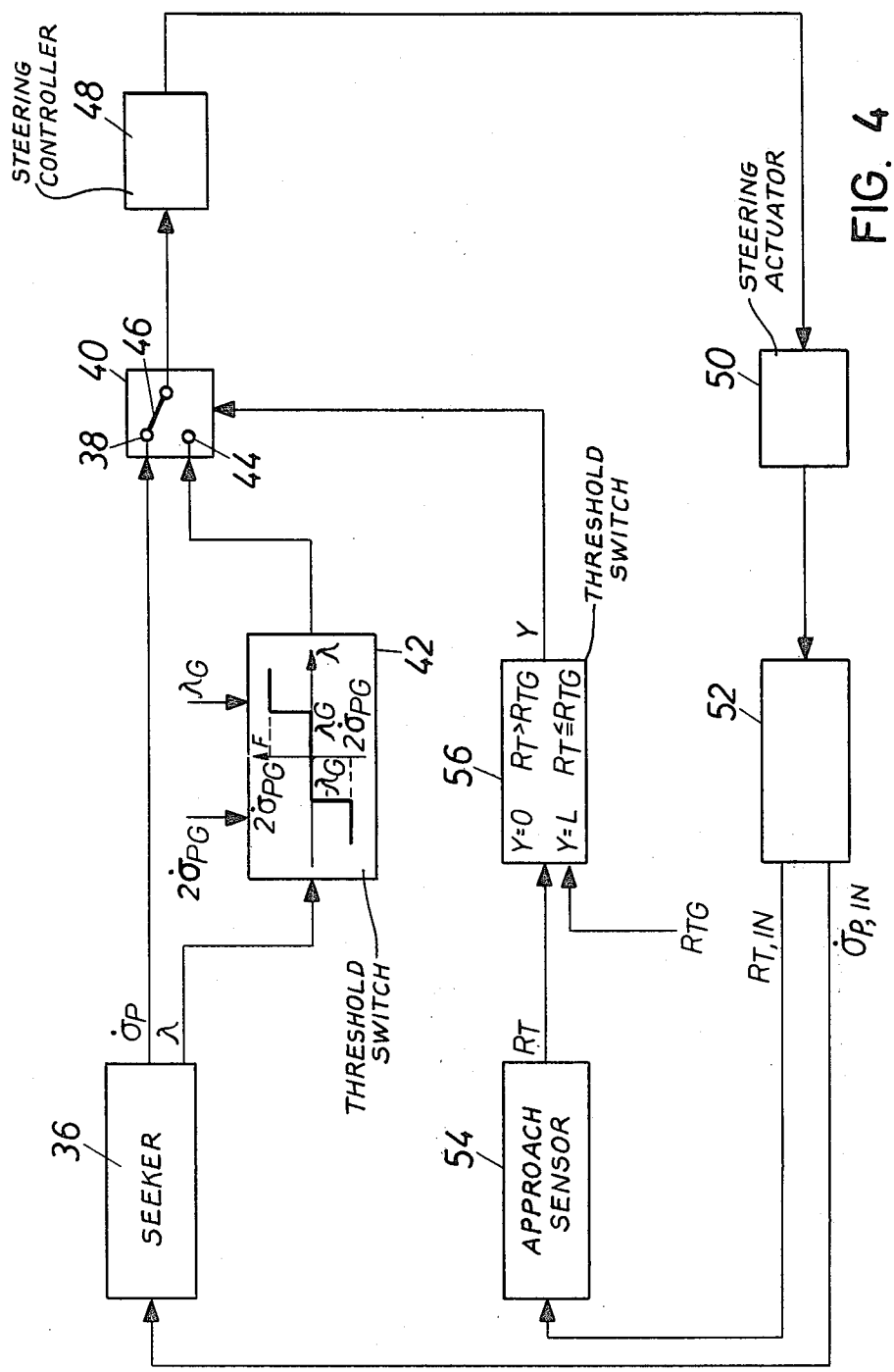
FIG. 4 is a block diagram of a steering device, which is simplified as compared to the embodiment of FIG. 2.

A steering device operating in accordance with this principle, is shown schematically as block diagram in FIG. 4.

In FIG. 4 numeral 36 designates a seeker which provides a signal $\dot{\sigma}_P$ proportional to the sight line rate $\sigma_{Pin}$ as well as a signal proportional to the look angle $\lambda$. The former signal is applied to a stationary contact 38 of a change-over switch 40 (which is illustrated here as a mechanical change-over switch but can be an electronic component). The look angle signal $\lambda$ is applied to a threshold switch 42, which provides an output signal of zero with a look angle $-\lambda_G \leqq \lambda \leqq +\lambda_G$, an output signal $+2 \dot{\sigma}_{PG}$ with a look angle of $\lambda > \lambda_G$, and an output signal $-2 \dot{\sigma}_{PG}$ with a look angle $\lambda < -\lambda_G$. This output signal is applied to a second stationary contact 44 of the change-over switch 40. The movable contact 46 of the change-over switch 40 (or its electronic equivalent) is connected to the steering controller 48.

The steering controller 48 influences the missile movements by means of a steering actuator 50, the missile movements and trajectory kinematics being again symbolized by a box 52. The sight line rate $\dot{\sigma}_{Pin}$ is measured by the seeker 36 and is converted into a corresponding signal $\dot{\sigma}_P$, whereby the normal steering loop is closed.

The distance $R_T$ of the missile from the target is detected by means of an approach sensor 54, and a corresponding signal is applied to a threshold switch 56. The threshold switch 56 provides an output signal $Y=O$ with $R_T > T_{TG}$ and an output signal $Y=L$ for $R_T \leq R_{TG}$. The L - signal at the output of the threshold switch moves the change-over switch 40 from the position illustrated, in which the contact 38 is connected to the input of the steering controller, into the other position, where the output of the threshold switch 42 is applied to the steering controller 48 through the contact 44.

When the distance $R_T$ becomes smaller than the limit value $R_{TG}$, the switch 40 is changed over, and the $\dot{\sigma}_P$—output of the seeker is disconnected from the steering controller. Instead the steering controller 48 receives the output signal $2\dot{\sigma}_{PG}$, when $\lambda > \lambda_G$ or $-2\dot{\sigma}_{PG}$, when $\lambda < -\lambda_G$. Then the steering controller 48 commands at any rate the maximum possible transverse acceleration of the missile with the sign corresponding to the sign of the look angle. $R_{TG}$ had been selected such, that this results in the desired lead.

The arrangement described was explained with reference to the steering of a missile onto a point in front of a "hot spot". The steering can, however, be used in the same manner to steer the missile onto a point which in some other way is located in front of the point detected by the seeker. If the seeker, for example, detects a jet engine located in the tail of the airplane, it will generally be more favorable to steer the missile onto a point, which is located a certain amount in front of this engine, as a hit is more efficient there.

I claim:

1. A missile steering device for directing a steering controller of a missile to cause the missile to fly to intercept an airplane in flight, wherein the steering device includes target seeker means continuously directed towards a target having a positional relationship with respect to said airplane and producing a sight line rate signal ($\sigma_P$) proportional to the rate of change in space of the sight line to said target, said steering device being characterized by:

said target seeker means also producing a "look angle" signal ($\lambda$) representing the angular difference between the longitudinal axis of the missile and the optical axis of the seeker means;

threshold switch means connected to said seeker means to receive said look angle signal and producing an output signal of a corresponding sign when the look angle signal exceeds or falls below respective threshold values ($+\lambda_G$ and $-\lambda_G$);

approach sensor means for producing an output signal ($R_T$) representing the distance between the missile and the airplane; and circuit means connecting the threshold switch means, the approach sensor means, the steering controller to receive said output signals and produce a lead signal for the controller to deflect the trajectory of the missile towards a point offset, along the path of the airplane, and in the direction of the airplane velocity vector ($V_T$), with respect to said target, when the distance between the missile and the airplane are less than a given magnitude and the look angle is greater than said respective threshold values.

2. A steering device as set forth in claim 1, wherein said circuit means includes:

a multiplier having a plurality of inputs and an output;

means connecting a first of said plurality of inputs to said threshold switch means to apply the output signal thereof to said first input;

means connecting a second of said plurality of inputs to said approach sensor means to apply to said second input a signal proportional to the time derivative ($\dot{R}_T$) of said output signal ($R_T$) of said sensor means;

means connecting other of the plurality of inputs to said approach sensor means to apply to the other of the plurality of inputs a signal which is the inverse ($1/R_T$) of said output signal ($R_T$) of said sensor means; and means connecting the output of the multiplier, the seeker means and the steering controller to combine the output signal of the multiplier with the sight line rate signal and supply the so-combined signal to the steering controller.

3. A steering device as set forth in claim 1, wherein said circuit means includes:

distance threshold switch means having an input and an output, said input being connected to said approach sensor means to receive said output signal ($R_T$) therefrom, said switch means producing a change-over signal (Y) at the output thereof when said approach sensor output signal ($R_T$) falls below a distance value ($R_{TG}$) determined by the maximum lateral acceleration capacity of the missile;

change-over switch means having an output connected to the steering controller, two information inputs and a control input, said information inputs being connected to the target seeker means and the threshold switch means respectively to receive said rate signal ($\dot{\sigma}_P$) and said output signal of the threshold switch means, said control input being connected output of said distance threshold switch means, said change-over switch means applying said rate signal ($\dot{\sigma}_P$) to its output until said change-over signal (Y) is received and thereafter applying to its output said output signal of the threshold switch means.

* * * * *